United States Patent
Zhou et al.

(10) Patent No.: US 11,713,970 B2
(45) Date of Patent: Aug. 1, 2023

(54) POSITIONING METHOD, ELECTRONIC DEVICE AND COMPUTER READABLE STORAGE MEDIUM

(71) Applicant: Beijing Baidu Netcom Science and Technology Co., Ltd., Beijing (CN)

(72) Inventors: Yao Zhou, Beijing (CN); Guowei Wan, Beijing (CN); Shiyu Song, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 190 days.

(21) Appl. No.: 17/209,159

(22) Filed: Mar. 22, 2021

(65) Prior Publication Data
US 2021/0209792 A1    Jul. 8, 2021

(30) Foreign Application Priority Data

Jun. 22, 2020   (CN) ......................... 202010572148.8

(51) Int. Cl.
*G01C 21/28* (2006.01)
*G06T 7/73* (2017.01)
(Continued)

(52) U.S. Cl.
CPC ............... *G01C 21/28* (2013.01); *G06T 7/73* (2017.01); *G06V 10/764* (2022.01); *G06V 10/82* (2022.01);
(Continued)

(58) Field of Classification Search
CPC ............. G06T 7/73; G06T 2207/10028; G06T 2207/10016; G06T 2207/20084;
(Continued)

(56) References Cited

U.S. PATENT DOCUMENTS 11,204,605 B1 * 12/2021 Allais .................. G05D 1/0088
2017/0322981 A1    11/2017 Zhang et al.
(Continued)

FOREIGN PATENT DOCUMENTS

CN      103389103 A    11/2013
CN      106407315 A    2/2017
(Continued)

OTHER PUBLICATIONS

Extended European Search Report corresponding to European Patent Application No. 21164221.0, dated Sep. 1, 2021 (11 pages).
(Continued)

*Primary Examiner* — Jerome Grant, II
(74) *Attorney, Agent, or Firm* — Maginot, Moore & Beck LLP

(57) ABSTRACT

A positioning method includes acquiring an image of an area where a target object is located at a first time instant and multiple frames of point cloud data of an area where the target object is located at multiple time instants, wherein the multiple frames of point cloud data include first point cloud data of the area where the target object is located at the first time instant. The method also includes determining a point cloud map according to the multiple frames of point cloud data and acquiring a target feature vector according to the first point cloud data, the point cloud map and the image. The method further includes determining a positioning result of the target object according to the target feature vector.

12 Claims, 2 Drawing Sheets

(51) Int. Cl.
*G06V 10/764* (2022.01)
*G06V 10/82* (2022.01)
*G06V 20/58* (2022.01)

(52) U.S. Cl.
CPC .... *G06V 20/58* (2022.01); *G06T 2207/10028* (2013.01)

(58) Field of Classification Search
CPC ............ G06T 2207/30252; G06T 7/33; G06V 10/443; G06V 10/462; G06V 20/58; G06V 10/764; G06V 10/82; G06N 3/08; G01S 7/4808; G01S 17/86; G01S 17/89; G01S 17/931; G01S 17/46; G01C 21/28; G01C 21/3602
USPC .......................................................... 382/103
See application file for complete search history.

(56) References Cited

U.S. PATENT DOCUMENTS

| | | |
|---|---|---|
| 2019/0096086 A1 | 3/2019 | Xu et al. |
| 2019/0206071 A1 | 7/2019 | Yan et al. |
| 2019/0323844 A1 | 10/2019 | Daedeepya et al. |
| 2019/0383945 A1 | 12/2019 | Wang et al. |
| 2019/0385360 A1 | 12/2019 | Sheng et al. |
| 2020/0082207 A1 | 3/2020 | Xie et al. |
| 2020/0184727 A1 | 6/2020 | Ha et al. |
| 2020/0193619 A1 | 6/2020 | Danielsson et al. |

FOREIGN PATENT DOCUMENTS

| | | | | |
|---|---|---|---|---|
| CN | 104317959 A | | 7/2018 | |
| CN | 108776991 | * | 11/2018 | ............ G06T 17/00 |
| CN | 110163903 A | | 8/2019 | |
| CN | 110175576 A | | 8/2019 | |
| CN | 110415297 A | | 11/2019 | |
| CN | 110660103 A | | 1/2020 | |
| CN | 111291714 A | | 6/2020 | |
| CN | 112101092 | * | 12/2020 | ............ G06V 20/58 |
| CN | 114596555 | * | 8/2022 | ........... G06K 9/6215 |
| JP | 2017117386 A | | 6/2017 | |
| JP | 2019149149 A | | 9/2019 | |
| JP | 2020042816 A | | 3/2020 | |
| KR | 1020200071293 A | | 6/2020 | |
| WO | WO2019060125 | * | 3/2019 | ............... G06K 9/46 |

OTHER PUBLICATIONS

Held, David, Jesse Levinson, and Sebastian Thrun. "Precision tracking with sparse 3d and dense color 2d data." 2013 IEEE International Conference on Robotics and Automation. IEEE, 2013.
English Machine Translation of CN110415297A. (26 Pages).
Japanese Office Action corresponding to Japanese Patent Application No. 2021-048139, dated Apr. 28, 2022 (3 pages).
English Translation of Japanese Office Action corresponding to Japanese Patent Application No. 2021-048139, dated Apr. 28, 2022 (3 pages).
Machine English Translation of JP2017117386A. (30 Pages).
Korean Office Action corresponding to Korean Patent Application No. 10-2021-0037456, dated Jul. 11, 2022 (4 pages).
English Translation of Korean Office Action corresponding to Korean Patent Application No. 10-2021-0037456, dated Jul. 11, 2022 (4 pages).
European Office Action corresponding to European Patent Application No. 21164221.0, dated Jun. 10, 2022 (9 pages).
Lu, Weixin, et al. "L3-net: Towards learning based lidar localization for autonomous driving." Proceedings of the IEEE/CVF Conference on Computer Vision and Pattern Recognition. 2019.
Chinese Office Action corresponding to Chinese Patent Application No. 202010572148.8, dated Sep. 1, 2022 (9 pages).
English Translation of Chinese Office Action corresponding to Chinese Patent Application No. 202010572148.8, dated Sep. 1, 2022 (4 pages).
Machine English Translation of CN110175576A. (24 Pages).
Machine English Translation of CN103389103A. (13 Pages).
Machine English Translation of CN106407315A. (19 Pages).
Machine English Translation of CN110163903A. (37 Pages).
Machine English Translation of CN110660103A. (46 Pages).
Machine English Translation of CN111291714A. (17 Pages).

* cited by examiner

POSITIONING METHOD, ELECTRONIC DEVICE AND COMPUTER READABLE STORAGE MEDIUM

CROSS-REFERENCE TO RELATED APPLICATION

This application claims priority to the Chinese patent application No. 202010572148.8 filed in China on Jun. 22, 2020, a disclosure of which is incorporated herein by reference in its entirety.

TECHNICAL FIELD

The present disclosure relates to positioning technologies of the automatic driving field, and specifically to a positioning method, a positioning device, and an electronic device.

BACKGROUND

Positioning technologies are key basic technologies in autonomous driving systems. The positioning technologies are not only an indispensable input for a path planning module, but also may simplify scene understanding of a perception module and classification algorithms. In the related art, positioning is performed only based on point cloud information, and a positioning accuracy thereof is low.

SUMMARY

The embodiments of the present disclosure provide a positioning method, a positioning device, and an electronic device.

According to a first aspect, the present disclosure provides a positioning method, and the method includes acquiring an image of an area where a target object is located at a first time instant, and multiple frames of point cloud data of an area where the target object is located at multiple time instants, wherein the multiple frames of point cloud data includes first point cloud data of the area where the target object is located at the first time instant. The method also includes determining a point cloud map according to the multiple frames of point cloud data, and acquiring a target feature vector according to the first point cloud data, the point cloud map, and the image. The method further includes determining a positioning result of the target object according to the target feature vector.

According to a second aspect, the present disclosure provides a positioning device having a first acquisition module, a determination module, a second acquisition module, and a positioning module. The first acquisition module is configured to acquire an image of an area where a target object is located at a first time instant, and multiple frames of point cloud data of an area where the target object is located at multiple time instants, wherein the multiple frames of point cloud data includes first point cloud data of the area where the target object is located at the first time instant. The determination module is configured to determine a point cloud map according to the multiple frames of point cloud data. The second acquisition module is configured to acquire a target feature vector according to the first point cloud data, the point cloud map, and the image. The positioning module is configured to determine a positioning result of the target object according to the target feature vector.

According to a third aspect, an electronic device includes at least on processor and a storage communicatively connected to the at least one processor. The storage stores instructions configured to be executable by the at least one processor, and the at least one processor is configured to execute the instructions to implement the method in the first aspect.

According to a fourth aspect, the present disclosure provides a non-transitory computer-readable storage medium storing therein computer instructions, wherein the computer instructions are used for causing a computer to implement the method in the first aspect.

BRIEF DESCRIPTION OF THE DRAWINGS

The drawings are used to better understand the solutions of the present disclosure and constitute no limitation to the present disclosure.

DETAILED DESCRIPTION

In the following description, exemplary embodiments of the present disclosure are described in combination with drawings. Numerous details of the embodiments of the present disclosure, which should be deemed merely exemplary, are provided to facilitate thorough understanding of the embodiments of the present disclosure. Therefore, those skilled in the art will appreciate that numerous modifications and replacements may be made in the described embodiments without departing from the scope and the spirit of the present disclosure. Further, for clarity and conciseness, descriptions of known functions and structures are omitted in the following description.

The embodiments of the present disclosure provide a positioning method, a positioning device, and an electronic device to solve the problem in the related art that a positioning accuracy is low when positioning is performed based only on point cloud information.

Figure 1:
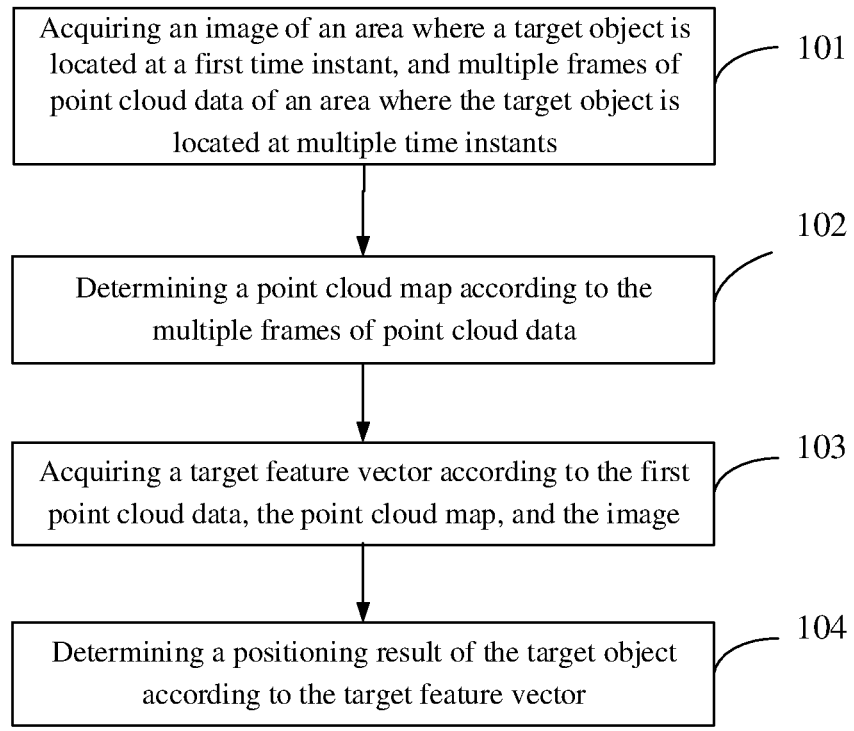
FIG. 1 is a flowchart of a positioning method provided in an embodiment of the present disclosure.

Referring to FIG. 1, FIG. 1 is a flowchart of a positioning method provided in an embodiment of the present disclosure. As shown in FIG. 1, the embodiment provides a positioning method applied to an electronic device, and the method includes the following steps 101-104.

Step 101: acquiring an image of an area where a target object is located at a first time instant, and multiple frames of point cloud data of an area where the target object is located at multiple time instants, wherein the multiple frames of point cloud data include first point cloud data of the area where the target object is located at the first time instant.

The first time instant may be a current time instant. point cloud data refers to a set of vectors in a three-dimension coordinate system. These vectors may represent a position of a point in a form of three-dimension coordinates of x, y and z, to represent a shape of an outer surface of an object. In addition to position information represented by (x, y, z), the point cloud data may also represent a pixel value, depth, etc., that is, the point cloud data includes multiple points, and each point includes position information and attribute information. The position information may be a coordinate position, and the attribute information may be a pixel value, depth, and so on. The point cloud data may be acquired by a lidar sensor, such as a laser detection and ranging system (Light Detection and Ranging, referred to as LiDAR). The image may be captured by a camera, such as a surround-view camera. The lidar sensor and the surround-view camera are set on the target object, and the target object may be a vehicle. The image of the area where the target object is located at the first time instant may be understood as an image of a surrounding environment of the target object acquired at the first time instant, and the first point cloud data of the area where the target object is located at the first time instant may be understood as: point cloud data of the surrounding environment of the target object acquired at the first time instant.

Step 102: determining a point cloud map according to the multiple frames of point cloud data.

The point cloud map may be determined based on the multiple frames of point cloud data acquired at multiple time instants, and one frame of point cloud data is acquired at each time instant, and the multiple time instants are optionally adjacent time instants. The multiple frames of point cloud data include the first point cloud data acquired at the first time instant, and a coordinate of a point in the point cloud map may be a three-dimension coordinate.

Step 103: acquiring a target feature vector according to the first point cloud data, the point cloud map, and the image.

The target feature vector is determined according to the point cloud data and the image. For example, for each point in the point cloud data, a target feature vector corresponding to the point data is determined according to information (such as position information and attribute information) of the point and a corresponding pixel point of the point in the image.

Step 104: determining a positioning result of the target object according to the target feature vector.

The positioning result may include a position and an attitude of the target object. Since the target feature vector is determined based on the point cloud data and the image, comprehensive consideration of the point cloud data and information of the image may make the positioning result more accurate.

In the embodiment, the image of the area where the target object is located at the first time instant and multiple frames of point cloud data of the area where the target object is located at multiple time instants are acquired, wherein the multiple frames of point cloud data include the first point cloud data of the area where the target object is located at the first time instant; the point cloud map is determined according to the multiple frames of point cloud data; the target feature vector is acquired according to the first point cloud data, the point cloud map and the image; the positioning result of the target object is determined according to the target feature vector. The target feature vector integrates the point cloud data and information of the image, which may make the positioning result of the target object more accurate due to the image including rich scene texture information.

In an embodiment of the present disclosure, Step 103 of acquiring the target feature vector according to the first point cloud data, the point cloud map, and the image includes:

determining one or more key points according to the first point cloud data;

predicting an attitude of the target object, and acquiring at least one attitude;

for each attitude of the at least one attitude, determining a matching point, that matches each target point in the one or more key points, in the point cloud map, and acquiring multiple matching points;

acquiring the target feature vector according to the one or more key points, the multiple matching points and the image.

The first point cloud data includes multiple points, and each point corresponds to a piece of point data. The piece of point data includes position information and attribute information. The key point is determined based on multiple points, and in this way, the number of points that need to be processed may be reduced and a processing efficiency may be improved. The key point includes key point data, and the key point data may include a coordinate position of the key point, and may also include attribute information of the key point.

An attitude of the target object is predicted, and at least one attitude is acquired, the attitude may include one or more of a roll angle, a pitch angle, and a yaw angle of the target object.

For one attitude, a matching point, in the point cloud map, for each target point in the one or more key points is firstly determined for this attitude, and a target point for each attitude corresponds to a matching point. For example, if there are i predicted attitudes and i is a positive integer, then for each target point, i matching points may be acquired from the point cloud map. Then the target feature vector is acquired based on the acquired one or more key points, multiple matching points and the image.

In the embodiment, the one or more key points are determined from the multiple points included in the point cloud data, which may reduce the number of points that need to be processed and improve the processing efficiency. Then matching points in each attitude of the target object are determined based on the one or more key points, and finally the target feature vector is determined based on the one or more key points, the matching points and the image. The image includes rich scene texture information, and the target feature vector integrates the point cloud data and information of the image, which may make the positioning result of the target object more accurate.

In an embodiment of the present disclosure, acquiring the target feature vector according to the one or more key points, the multiple matching points and the image includes:

for each target point in the one or more key points, determining a first point set corresponding to the target point, wherein the first point set includes the target point and N first points within a first preset distance centered on the target point in the first point cloud data, and N is a positive integer;

for each matching point in the multiple matching points, determining a second point set corresponding to the matching point, wherein the second point set includes the matching point and N second points within a second preset distance centered on the matching point in the point cloud map;

acquiring a first feature vector of a first point in the first point set according to the image;

acquiring multiple frames of images corresponding to the multiple frames of point cloud data;

acquiring a second feature vector of a second point in the second point set based on the multiple frames of images, wherein the target feature vector includes the first feature vector and the second feature vector.

In the embodiment, for the matching points and each target point in the one or more key points, a coordinate of the matching point or the target point is taken as a center, and N points within a preset distance are acquired. That is, for each target point in the one or more key points, a first point set corresponding to the target point is determined, wherein the first point set includes the target point and N first points within a first preset distance centered on the target point in the first point cloud data, and N is a positive integer. Optionally, N may be a value selected from a range from 10 to 200. A first point set may be acquired according to each target point.

For each matching point in the multiple matching points, a second point set corresponding to the matching point is determined, wherein the second point set includes the matching point and N second points within a second preset distance centered on the matching point in the point cloud map. The first preset distance and the second preset distance may be set according to actual situation, which will not be limited here. A second point set may be acquired according to each matching point.

Points in the first point set are points in the first point cloud data, and points in the second point set are points in the point cloud map. When the first feature vector of the first point in the first point set is determined, the first feature vector may be determined according to an image acquired in synchronization with the first point cloud data.

Points in the second point set are points in the point cloud map. The point cloud map is determined by the multiple frames of point cloud data acquired at multiple time instants. At each time instant of the multiple time instants, the point cloud data and the corresponding image will be acquired, i.e., the multiple frames of point cloud data correspond to multiple frames of images, wherein each frame of point cloud data corresponds to one frame of image. The second feature vector of the point in the second point set may be acquired based on the multiple frames of images corresponding to the multiple frames of point cloud data.

In the embodiment, a first feature vector of a first point in the first point set is acquired according to the image; a second feature vector of a second point in the second point set is acquired based on the multiple frames of images corresponding to the multiple frames of point cloud data, wherein the target feature vector includes the first feature vector and the second feature vector. In this way, the target feature vector integrates the multiple frames of point cloud data and information of the multiple frames of images, which may make the positioning result of the target object more accurate.

Further, after the target feature vector is acquired, the target feature vector is inputted into a positioning network to acquire a positioning result, and the positioning result includes the position and the attitude of the target object. The positioning network may be a laser point cloud positioning network based on learning, such as an L3-Net network. When the target feature vector is inputted to the positioning network, the first feature vectors of all first points in the first point set compose a vector unit, and the second feature vectors of all second points in the second point set compose a vector unit. A vector unit is inputted into the positioning network as a unit. For example, if the number of points in each point set is 64, then each vector unit includes 64 first feature vectors or 64 second feature vectors. The positioning network is used to predict the position and the attitude of the target object to acquire the positioning result.

In an embodiment of the present disclosure, acquiring the first feature vector of the first point in the first point set according to the image includes:

acquiring a feature map of the image according to the image, wherein the feature map includes a feature vector corresponding to a pixel point in the image;

for each first point in the first point set, determining a first pixel point, in the image, corresponding to the first point;

determining a feature vector, corresponding to the first pixel point, in the feature map according to the first pixel point;

splicing the feature vector corresponding to the first pixel point with information of the first point, and acquiring the first feature vector corresponding to the first point.

In the embodiment, when acquiring a feature map of an image is acquired based on the image, a deep learning network may be used to extract the feature map from the image, and parameters of the deep learning network may be acquired by training performed by using a supervised or non-supervised approach. For each pixel point in the image, the feature map includes a feature vector corresponding to the pixel point. The feature vector may be an n-dimension vector, and a value of n may be 8, 16, or 32, which is not limited here. The information of the first point may include position information of the first point, and may also include attribute information of the first point.

For example, a surround-view camera and a lidar sensor are mounted on a vehicle, and the surround-view camera and the lidar sensor have completed a synchronization of a time stamp and a camera frequency, that is, the surround-view camera and the lidar sensor may acquire an image and point cloud data belonging to the same frame, so that a precise correspondence between the point cloud data and the image may be acquired. For one frame of point cloud data, a coordinate of a point in the point cloud data in space is $P=(x,y,z)$, the point has a corresponding pixel point in the image, and a coordinate of the corresponding pixel point is $pix=(u,v)$.

For each first point, the first pixel point corresponding to the first point in the image may be determined according to a coordinate position of the first point, and then a feature vector, corresponding to the first pixel point, in the feature map is determined according to the first pixel point. Finally, the feature vector corresponding to the first pixel point is spliced with information of the first point to acquire the target feature vector corresponding to the first point. The information of the first point may be the coordinate position of the first point. For example, a coordinate position $(x, y, z)$ of the first point and an image feature F corresponding to the first point (that is, the feature vector of the first pixel point corresponding to the first point) are spliced together to form an $(n+3)$-dimension vector $(x, y, z, F)$, the vector is the first feature vector corresponding to the first point, and the first feature vector may be used as an attribute of the first point. In addition, a pixel value, a depth value, and a coordinate position of the first point may also be spliced with an image feature corresponding to the first point, and the vector acquired after splicing may be used as the first feature vector.

For each first point in the first point set, the above-mentioned method may be used to determine the first feature vector corresponding to the first point.

In the embodiment, for first feature vector included in the target feature vector, the first point cloud data and the information of the image at the first time instant are taken into consideration, and information included in the target feature vector is added. Therefore, when the target object is positioned based on the target feature vector, a more accurate positioning result may be acquired.

In an embodiment of the present disclosure, acquiring the second feature vector of the second point in the second point set based on the multiple frames of images includes:

for each second point in the second point set, acquiring a target frame of point cloud data corresponding to the second point, wherein the target frame of point cloud data includes a third point, and the third point corresponds to the second point in the point cloud map;

acquiring a first feature map according to an image corresponding to the target frame of point cloud data;

determining a feature vector, corresponding to the third point, in the first feature map;

splicing the feature vector corresponding to the third point with information of the third point, and acquiring the second feature vector corresponding to the second point.

In the embodiment, the second point is a point in the point cloud map, and the third point is a point in the target frame of point cloud data. The information of the second point in the point cloud map may be determined according to the information of the third point in the target frame of point cloud data. For example, a coordinate position of the second point in the point cloud map may be determined according to a coordinate position of the third point in the target frame of point cloud data. The target frame of point cloud data may be the first point cloud data acquired at the first time instant, or may be a historical frame of point cloud data acquired at a historical time instant. Each frame of point cloud data corresponds to a frame of image, that is, for each frame of point cloud data, there is a synchronously acquired image.

When a first feature map is acquired according to the first image corresponding to the target frame of point cloud data, a deep learning network may be used to extract the first feature map from the first image. For each pixel point in the first image, the feature map includes a feature vector corresponding to the pixel point. The feature vector may be an n-dimension vector, and a value of n may be 8, 16, or 32, which is not limited here.

The pixel point, corresponding to the third point of the target frame of point cloud data, in the first image may be determined according to the coordinate position of the third point. Then, the feature vector, corresponding to the pixel point, in the first feature map is determined according to the pixel point, and the feature vector is the feature vector corresponding to the third point. Finally, the feature vector corresponding to the pixel point is spliced with the information of the third point to acquire the feature vector corresponding to the third point. The information of the third point may be the coordinate position of the third point. For example, a coordinate position of the third point (x1, y1, z1) and an image feature F1 corresponding to the third point (that is, the feature vector of the pixel point corresponding to the third point) are spliced together to generate three (n+3)-dimension vectors (x1, y1, z1, F1), the vector is the feature vector corresponding to the third point, and the feature vector may be used as an attribute of the third point. In addition, a pixel value, a depth value, and a coordinate position of the third point may also be spliced with an image feature corresponding to the third point, and the vector acquired after splicing may be used as the feature vector of the third point, and finally, the feature vector of the third point is determined as the second feature vector corresponding to the second point.

The above-mentioned method may be used to determine the second feature vector corresponding to each second point in the second point set.

In the embodiment, for the second feature vector included in the target feature vector, the multiple frames of point cloud data and the information of the multiple frames of images are taken into consideration, so that information included in the target feature vector is richer. Therefore, when the target object is positioned based on the target feature vector, a more accurate positioning result may be acquired.

Figure 2:
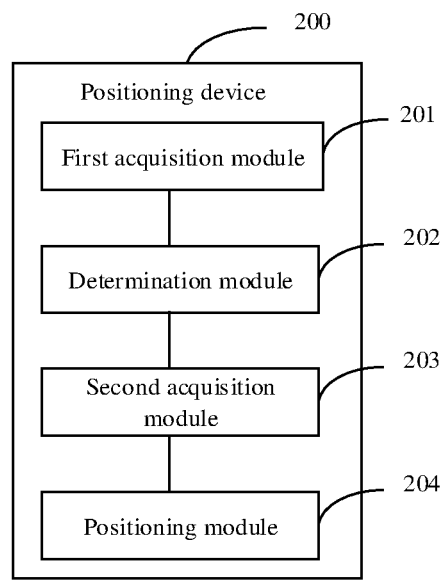
FIG. 2 is a structural diagram of a positioning device provided in an embodiment of the present disclosure.

Referring to FIG. 2, FIG. 2 is a structural diagram of a positioning device provided in an embodiment of the present disclosure. As shown in FIG. 2, the embodiment provides a positioning device 200, and the device includes:

a first acquisition module, configured to acquire an image of an area where a target object is located at a first time instant, and multiple frames of point cloud data of an area where the target object is located at multiple time instants, wherein the multiple frames of point cloud data include first point cloud data of the area where the target object is located at the first time instant;

a determination module, configured to determine a point cloud map according to the multiple frames of point cloud data;

a second acquisition module, configured to acquire a target feature vector according to the first point cloud data, the point cloud map, and the image;

a positioning module, configured to determine a positioning result of the target object according to the target feature vector.

Further, the second acquisition module includes:

a first determination submodule, configured to determine one or more key points according to the first point cloud data;

a first acquisition submodule, configured to predict an attitude of the target object, and acquire at least one attitude;

a second determination submodule, configured to, for each attitude of the at least one attitude, determine a matching point, that matches each target point in the one or more key points, in the point cloud map, and acquire multiple matching points;

a second acquisition submodule, configured to acquire the target feature vector according to the key point, the multiple matching points and the image.

Further, the second acquisition submodule includes:

a first determination unit, configured to, for each target point in the one or more key points, determine a first point set corresponding to the target point, wherein the first point set includes the target point and N first points within a first preset distance centered on the target point in the first point cloud data, and N is a positive integer;

a second determination unit, configured to, for each matching point in the multiple matching points, determine a second point set corresponding to the matching point, wherein the second point set includes the matching point and N second points within a second preset distance centered on the matching point in the point cloud map;

a first acquisition unit, configured to acquire a first feature vector of a first point in the first point set according to the image;

a second acquisition unit, configured to acquire multiple frames of images corresponding to the multiple frames of point cloud data;

a third acquisition unit, configured to acquire a second feature vector of a second point in the second point set based on the multiple frames of images, wherein the target feature vector includes the first feature vector and the second feature vector.

Further, the first acquisition unit is configured to:

acquire a feature map of the image according to the image, wherein the feature map includes a feature vector corresponding to a pixel point in the image;

for each first point in the first point set, determine a first pixel point, corresponding to the first point, in the image;

determine a feature vector, corresponding to the first pixel point, in the feature map according to the first pixel point;

splice the feature vector corresponding to the first pixel point with information of the first point, and acquiring the first feature vector corresponding to the first point.

Further, the third acquisition unit is configured to:

for each second point in the second point set, acquire a target frame of point cloud data corresponding to the second point, wherein the target frame of point cloud data includes a third point, and the third point corresponds to the second point in the point cloud map;

acquire a first feature map according to an image corresponding to the target frame of point cloud data;

determine a feature vector, corresponding to the third point, in the first feature map;

splice the feature vector corresponding to the third point and information of the third point, and acquiring the second feature vector corresponding to the second point.

The positioning device 200 may implement each process implemented by the electronic device in the method embodiment shown in FIG. 1, and to avoid repetition, details thereof are not described herein again.

The positioning device 200 of the present embodiment of the present disclosure acquires the image of the area where the target object is located at the first time instant and the multiple frames of point cloud data of the area where the target object is located at multiple time instants, wherein the multiple frames of point cloud data include the first point cloud data of the area where the target object is located at the first time instant; determines the point cloud map according to the multiple frames of point cloud data; acquires the target feature vector according to the first point cloud data, the point cloud map and the image; determines the positioning result of the target object according to the target feature vector. The image includes rich scene texture information, and the target feature vector integrates the point cloud data and information of the image, which may make the positioning result of the target object more accurate.

According to embodiments of the present disclosure, an electronic device and a readable storage medium are further provided.

Figure 3:
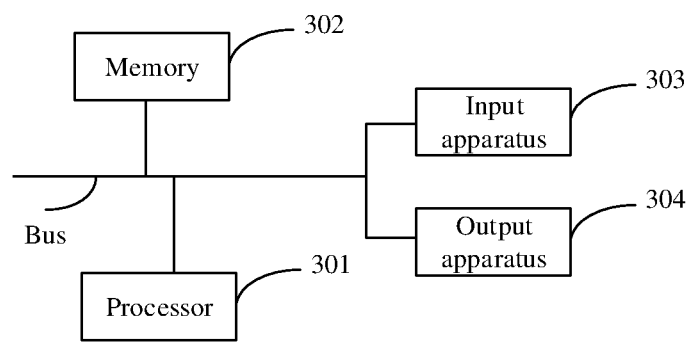
FIG. 3 is a block diagram of an electronic device for implementing a positioning method of an embodiment of the present disclosure.

As shown in FIG. 3, a block diagram of an electronic device of a positioning method according to embodiments of the present disclosure is illustrated. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 3, the electronic device includes: one or more processors 301, a memory 302, and interfaces for connecting various components, including a high-speed interface and a low-speed interface. The various components are interconnected using different buses and may be mounted on a common motherboard or mounted in another manner as desired. The processors may process instructions configured to be executed in the electronic device, and the instructions include instructions stored in the memory or on the memory to display graphical information of GUI on an external input/output device (such as a display device coupled to the interface). In other embodiments, multiple processors and/or multiple buses may be used with multiple memories, if necessary. Also, multiple electronic devices may be connected, and each electronic device provides some of the necessary operations (e.g., in a server array, a group of blade servers, or a multi-processor system). FIG. 3 illustrates a single processor 301 as an example.

The memory 302 is a non-transitory computer-readable storage medium provided herein. The memory stores therein instructions executable by at least one processor to cause the at least one processor to implement the positioning method according to the present disclosure. The non-transitory computer-readable storage medium of the present disclosure stores therein computer instructions for causing a computer to implement the positioning method according to the present disclosure.

The memory 302, as a non-transitory computer-readable storage medium, may be used to store non-transitory software programs, non-transitory computer-executable programs, and modules, such as program instructions/modules (e.g., the first acquisition module 201, the determination module 202, the second acquisition module 203, and the positioning module 203 shown in FIG. 2) corresponding to the positioning method in the embodiments of the present. By running non-transitory software programs, instructions and modules stored in the memory 302, the processor 301 performs various functional applications and data processing of the server, i.e., implements the positioning method in the method embodiment described above.

The memory 302 may include a program storage area and a data storage area, where the program storage area may store an operating system, and an application program required for at least one function; and the data storage area may store data created according to the usage of the electronic device for implementing the positioning method. In addition, the memory 302 may include a high speed random access memory, and may also include a non-transitory memory, such as at least one magnetic disk storage device, flash memory device, or other non-transitory solid state storage device. In some embodiments, the memory 302 may optionally include a memory remotely located with respect to the processor 301. These remote memories may be connected via a network to the electronic device for implementing the positioning method. Examples of the network mentioned above include, but are not limited to, the Internet, an intranet, a local area network, a mobile communication network, and a combination thereof.

The electronic device for implementing the positioning method may further include: an input apparatus 303 and an output apparatus 304. The processor 301, the memory 302, the input apparatus 303, and the output apparatus 304 may be connected to each other via a bus or in other ways. In FIG. 3, a connection by way of a bus is taken as an example.

The input apparatus 303 may receive inputted numeric or character information and generate key signal inputs related to user settings and functional controls of the electronic device for implementing the positioning method. For example, the input apparatus may include a touch screen, a keypad, a mouse, a trackpad, a touch pad, a pointing stick, one or more mouse buttons, a trackball, a joystick, etc. The output apparatus 304 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein can be implemented in a digital electronic circuit system, an integrated circuit system, a dedicated ASIC (application specific integrated circuits), computer hardware, firmware, software, and/or combinations thereof. These various embodiments may include implementation in one or more computer programs that may be executed and/or interpreted on a programmable system including at least one programmable processor. The programmable processor may be a dedicated or general purpose programmable processor, and may receive data and instructions from a storage system, at least one input apparatus and at least one output apparatus, and transmit data and the instructions to the storage system, the at least one input apparatus and the at least one output apparatus.

These computing programs (also referred to as programs, software, software applications, or codes) include machine instructions for a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., a magnetic disk, an optical disc, a memory, a programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and the technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and the technique described herein may be implemented in a computing system that includes a back-end component (e.g., as a data server), or that includes a middle-ware component (e.g., an application server), or that includes a front-end component (e.g., a client computer having a graphical user interface or a Web browser through which a user can interact with an implementation of the system and the technique described herein), or any combination of such back-end, middleware, or front-end components. The components of the system can be interconnected by any form or medium of digital data communication (e.g., a communication network). Examples of a communication networks include a local area network (LAN), a wide area network (WAN) and the Internet.

The computer system can include a client and a server. The client and the server are generally remote from each other and typically interact through a communication network. Relationship between the client and the server arises by virtue of computer programs running on respective computers and having a client-server relationship with respect to each other.

According to technical solutions of the present embodiment of the present disclosure, the image of the area where the target object is located at the first time instant and the multiple frames of point cloud data of the area where the target object is located at multiple time instants are acquired, wherein the multiple frames of point cloud data include the first point cloud data of the area where the target object is located at the first time instant; the point cloud map is determined according to the multiple frames of point cloud data; the target feature vector is acquired according to the first point cloud data, the point cloud map and the image; the positioning result of the target object is determined according to the target feature vector. The image includes rich scene texture information, and the target feature vector integrates the point cloud data and information of the image, which may make the positioning result of the target object more accurate.

The one or more key points are determined from the multiple points included in the point cloud data, which may reduce the number of points that need to be processed and improve the processing efficiency. Then matching points for each attitude of the target object are determined based on the one or more key points, and finally the target feature vector is determined based on the one or more key points, the matching points and the image. The image includes rich scene texture information, and the target feature vector integrates the point cloud data and information of the image, which may make the positioning result of the target object more accurate.

A first feature vector of a first point in the first point set is acquired according to the image; a second feature vector of a second point in the second point set is acquired based on the multiple frames of images corresponding to the multiple frames of point cloud data, wherein the target feature vector includes the first feature vector and the second feature vector. In this way, the target feature vector integrates the multiple frames of point cloud data and information of the multiple frames of images, which may make the positioning result of the target object more accurate.

For the first feature vector included in the target feature vector, the first point cloud data and the information of the image at the first time instant are taken into consideration, and information included in the target feature vector is added. Therefore, when the target object is positioned based on the target feature vector, a more accurate positioning result may be acquired.

For the second feature vector included in the target feature vector, the multiple frames of point cloud data and the information of the multiple frames of images are taken into consideration, so that information included in the target feature vector is richer. Therefore, when the target object is positioned based on the target feature vector, a more accurate positioning result may be acquired.

The embodiments of the application have the following advantages or beneficial effects.

An image of an area where a target object is located at a first time instant and multiple frames of point cloud data of an area where the target object is located at multiple time instants are acquired, wherein the multiple frames of point cloud data include first point cloud data of the area where the target object is located at the first time instant; a point cloud map is determined according to the multiple frames of point cloud data; a target feature vector is acquired according to the first point cloud data, the point cloud map and the image; a positioning result of the target object is determined according to the target feature vector. The image includes rich scene texture information, and the target feature vector integrates the point cloud data and information of the image, which may make the positioning result of the target object more accurate.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the protection scope of the present disclosure. It is appreciated by those skilled in the art that, various modifications, combinations, sub-combinations and replacements may be made according to design requirements and other factors. Any modifications, equivalent replacements and improvements made without deviating from the spirit and principle of the present disclosure shall be deemed as falling within the protection scope of the present disclosure.

What is claimed is:

1. A positioning method, comprising:
    acquiring an image of an area where a target object is located at a first time instant, and multiple frames of point cloud data of an area where the target object is located at multiple time instants, wherein the multiple frames of point cloud data comprises first point cloud data of the area where the target object is located at the first time instant;
    determining a point cloud map according to the multiple frames of point cloud data;
    acquiring a target feature vector according to the first point cloud data, the point cloud map, and the image; and
    determining a positioning result of the target object according to the target feature vector,
    wherein acquiring the target feature vector according to the first point cloud data, the point cloud map, and the image comprises:
        determining one or more key points according to the first point cloud data;
        predicting an attitude of the target object, and acquiring at least one attitude;
        for each attitude of the at least one attitude, determining a matching point that matches each target point in the one or more key points in the point cloud map, and acquiring multiple matching points; and
        acquiring the target feature vector according to the one or more key points, the multiple matching points and the image.

2. The positioning method according to claim 1, wherein acquiring the target feature vector according to the one or more key points, the multiple matching points and the image comprises:
    for each target point in the one or more key points, determining a first point set corresponding to the target point, wherein the first point set comprises the target point and N first points within a first preset distance centered on the target point in the first point cloud data, wherein N is a positive integer;
    for each matching point in the multiple matching points, determining a second point set corresponding to the matching point, wherein the second point set comprises the matching point and N second points within a second preset distance centered on the matching point in the point cloud map;
    acquiring a first feature vector of a first point in the first point set according to the image;
    acquiring multiple frames of images corresponding to the multiple frames of point cloud data; and
    acquiring a second feature vector of a second point in the second point set based on the multiple frames of images, wherein the target feature vector comprises the first feature vector and the second feature vector.

3. The positioning method according to claim 2, wherein, acquiring the first feature vector of the first point in the first point set according to the image comprises:
    acquiring a feature map of the image according to the image, wherein the feature map comprises a feature vector corresponding to a pixel point in the image;
    for each first point in the first point set, determining a first pixel point, corresponding to the first point, in the image;
    determining a feature vector corresponding to the first pixel point, in the feature map according to the first pixel point; and
    splicing the feature vector corresponding to the first pixel point with information of the first point, and acquiring the first feature vector corresponding to the first point.

4. The positioning method according to claim 2, wherein acquiring the second feature vector of the second point in the second point set based on the multiple frames of images comprises:
    for each second point in the second point set, acquiring a target frame of point cloud data corresponding to the second point, wherein the target frame of point cloud data comprises a third point, and the third point corresponds to the second point in the point cloud map;
    acquiring a first feature map according to an image corresponding to the target frame of point cloud data;
    determining a feature vector corresponding to the third point, in the first feature map; and
    splicing the feature vector corresponding to the third point with information of the third point, and acquiring the second feature vector corresponding to the second point.

5. An electronic device, comprising:
    at least one processor; and
    a storage communicatively connected to the at least one processor,
    wherein the storage stores instructions configured to be executable by the at least one processor, and the at least one processor is configured to execute the instructions to implement a positioning method, the positioning method comprising:
    acquiring an image of an area where a target object is located at a first time instant, and multiple frames of point cloud data of an area where the target object is located at multiple time instants, wherein the multiple frames of point cloud data comprises first point cloud data of the area where the target object is located at the first time instant;
    determining a point cloud map according to the multiple frames of point cloud data;
    acquiring a target feature vector according to the first point cloud data, the point cloud map, and the image; and
    determining a positioning result of the target object according to the target feature vector,
    wherein acquiring the target feature vector according to the first point cloud data, the point cloud map, and the image comprises:
        determining one or more key points according to the first point cloud data;

predicting an attitude of the target object, and acquiring at least one attitude;

for each attitude of the at least one attitude, determining a matching point, that matches each target point in the one or more key points, in the point cloud map, and acquiring multiple matching points; and acquiring the target feature vector according to the one or more key points, the multiple matching points and the image.

6. The electronic device according to claim 5, wherein acquiring the target feature vector according to the one or more key points, the multiple matching points and the image comprises:

for each target point in the one or more key points, determining a first point set corresponding to the target point, wherein the first point set comprises the target point and N first points within a first preset distance centered on the target point in the first point cloud data, wherein N is a positive integer;

for each matching point in the multiple matching points, determining a second point set corresponding to the matching point, wherein the second point set comprises the matching point and N second points within a second preset distance centered on the matching point in the point cloud map;

acquiring a first feature vector of a first point in the first point set according to the image;

acquiring multiple frames of images corresponding to the multiple frames of point cloud data; and acquiring a second feature vector of a second point in the second point set based on the multiple frames of images, wherein the target feature vector comprises the first feature vector and the second feature vector.

7. The electronic device according to claim 6, wherein acquiring the first feature vector of the first point in the first point set according to the image comprises:

acquiring a feature map of the image according to the image, wherein the feature map comprises a feature vector corresponding to a pixel point in the image;

for each first point in the first point set, determining a first pixel point, corresponding to the first point, in the image;

determining a feature vector corresponding to the first pixel point, in the feature map according to the first pixel point;

splicing the feature vector corresponding to the first pixel point with information of the first point, and acquiring the first feature vector corresponding to the first point.

8. The electronic device according to claim 6, wherein acquiring the second feature vector of the second point in the second point set based on the multiple frames of images comprises:

for each second point in the second point set, acquiring a target frame of point cloud data corresponding to the second point, wherein the target frame of point cloud data comprises a third point, and the third point corresponds to the second point in the point cloud map;

acquiring a first feature map according to an image corresponding to the target frame of point cloud data;

determining a feature vector corresponding to the third point, in the first feature map;

splicing the feature vector corresponding to the third point with information of the third point, and acquiring the second feature vector corresponding to the second point.

9. A non-transitory computer readable storage medium, comprising computer instructions stored thereon, characterized in that the computer instructions are configured to be executed by a computer, to implement a positioning method, comprising:

acquiring an image of an area where a target object is located at a first time instant, and multiple frames of point cloud data of an area where the target object is located at multiple time instants, wherein the multiple frames of point cloud data comprises first point cloud data of the area where the target object is located at the first time instant;

determining a point cloud map according to the multiple frames of point cloud data;

acquiring a target feature vector according to the first point cloud data, the point cloud map, and the image; and determining a positioning result of the target object according to the target feature vector, wherein acquiring the target feature vector according to the first point cloud data, the point cloud map, and the image comprises:

determining one or more key points according to the first point cloud data;

predicting an attitude of the target object, and acquiring at least one attitude;

for each attitude of the at least one attitude, determining a matching point, that matches each target point in the one or more key points, in the point cloud map, and acquiring multiple matching points; and acquiring the target feature vector according to the one or more key points, the multiple matching points and the image.

10. The non-transitory computer readable storage medium according to claim 9, wherein acquiring the target feature vector according to the one or more key points, the multiple matching points and the image comprises:

for each target point in the one or more key points, determining a first point set corresponding to the target point, wherein the first point set comprises the target point and N first points within a first preset distance centered on the target point in the first point cloud data, wherein N is a positive integer;

for each matching point in the multiple matching points, determining a second point set corresponding to the matching point, wherein the second point set comprises the matching point and N second points within a second preset distance centered on the matching point in the point cloud map;

acquiring a first feature vector of a first point in the first point set according to the image;

acquiring multiple frames of images corresponding to the multiple frames of point cloud data; and acquiring a second feature vector of a second point in the second point set based on the multiple frames of images, wherein the target feature vector comprises the first feature vector and the second feature vector.

11. The non-transitory computer readable storage medium according to claim 10, wherein acquiring the first feature vector of the first point in the first point set according to the image comprises:

acquiring a feature map of the image according to the image, wherein the feature map comprises a feature vector corresponding to a pixel point in the image;

for each first point in the first point set, determining a first pixel point, corresponding to the first point, in the image;

determining a feature vector corresponding to the first pixel point, in the feature map according to the first pixel point; and splicing the feature vector corresponding to the first pixel point with information of the first point, and acquiring the first feature vector corresponding to the first point.

12. The non-transitory computer readable storage medium according to claim 10, wherein acquiring the second feature vector of the second point in the second point set based on the multiple frames of images comprises:

for each second point in the second point set, acquiring a target frame of point cloud data corresponding to the second point, wherein the target frame of point cloud data comprises a third point, and the third point corresponds to the second point in the point cloud map;

acquiring a first feature map according to an image corresponding to the target frame of point cloud data;

determining a feature vector corresponding to the third point, in the first feature map;

splicing the feature vector corresponding to the third point with information of the third point, and acquiring the second feature vector corresponding to the second point.

\* \* \* \* \*